UNITED STATES PATENT OFFICE.

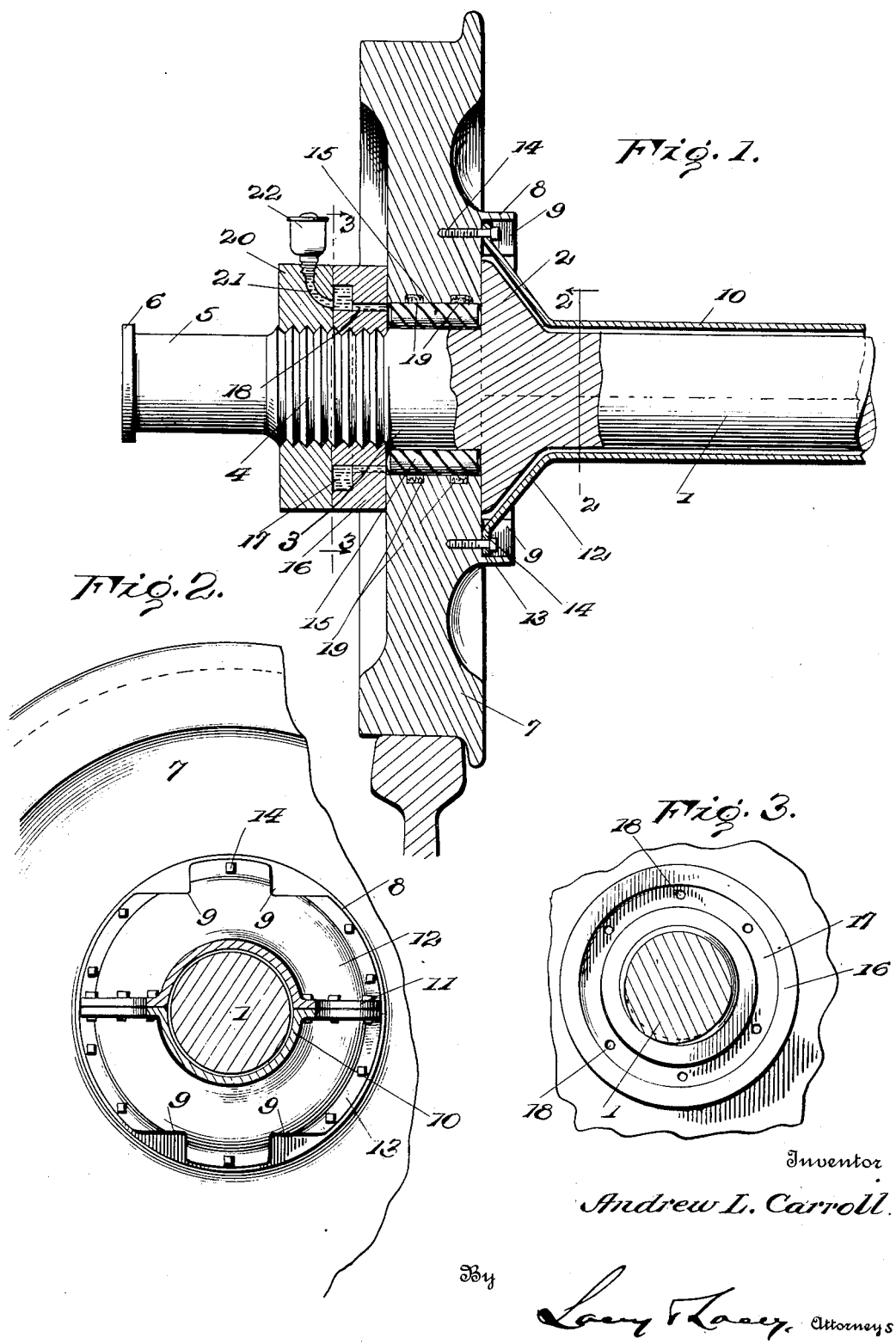

ANDREW L. CARROLL, OF ST. LOUIS, MISSOURI.

CAR-WHEEL.

1,367,799.  Specification of Letters Patent.  Patented Feb. 8, 1921.

Application filed July 13, 1920. Serial No. 395,961.

*To all whom it may concern:*

Be it known that I, ANDREW L. CARROLL, a citizen of the United States, residing in the city of St. Louis and State of Missouri, have invented certain new and useful Improvements in Car-Wheels, of which the following is a specification.

This invention relates to car wheels and has for its object the provision of simple and efficient means whereby the car wheel will be permitted to rotate freely and will be automatically lubricated. The invention also has for its object the provision of means whereby the wheel may be readily brought into proper alinement with the axle.

The invention is illustrated in the accompanying drawings and will be hereinafter fully described, the novel features being subsequently pointed out in the claims.

In the drawings—

Figure 1 is a transverse section of a car wheel having my improvements embodied therein;

Fig. 2 is a detail section on the line 2—2 of Fig. 1;

Fig. 3 is a detail section on the line 3—3 of Fig. 1.

In carrying out my invention, I provide the axle 1 with an annular shoulder or circular enlargement 2 near its end and at the outer side of said enlargement the axle has a smooth circular surface 3. Outwardly beyond the said smooth circular surface 3, the axle is constructed with a threaded portion 4 and beyond said threaded portion it is reduced in diameter and has a smooth surface, as indicated at 5, an annular flange 6 being formed at the extremity of the axle, as clearly shown in Fig. 1. The wheel 7 is of the usual or any preferred configuration, but has a central circular opening which is adapted to fit around the smooth surface portion 3 of the axle and is of larger diameter than said portion. The wheel is fitted close to the inner face of the shoulder 2 so that the wheels at the opposite sides of the track will be held in the proper spaced relation and upon the inner face of the wheel is formed a circular rib 8 concentric with the central opening through the wheel and provided on its inner side at intervals with angular inwardly projecting lugs 9. A casing 10 is fitted around the axle and is preferably constructed of two similar mating members adapted to fit around the axle and provided with flanges 11 at their meeting edges through which suitable securing bolts are passed to fasten the casing around the axle. The ends of the casing are flared, as shown at 12, to accommodate the circular enlargement or shoulder 2 and the edges of the flared portions are bent to fit flat against the side of the wheel, as shown at 13, bolts, screws or other fastenings 14 being inserted through said edge portions to secure the casing to the wheel. The casing is also provided with notches in its edge portions 13 which engage the angular lugs 9 of the rib 8 and thereby aid in bringing the casing into its proper position relative to the wheel and also aid in maintaining the wheel in proper concentric relation to the axle.

It will be understood that the wheels are provided in pairs and that the opposite ends of the casing are secured to the mating wheels thereby holding the wheels properly spaced apart with a minimum frictional wear upon the shoulders 2 of the axle. It it also within the scope of my invention to extend the casing only a short distance along the axle and fit the inner end of the casing to the axle with an anti-friction bearing so that it may rotate freely about the axle while excluding dust and dirt from the hub of the car wheel.

Around the smooth faced portion 3 of the axle and between the same and the wall of the central circular opening in the wheel, I provide a plurality of rollers 15 which permit the wheel to rotate very easily about the axle, endwise movement of the rollers in one direction being prevented by the circular shoulder 2 of the axle as will be readily understood. To prevent endwise movement of the wheel and the rollers in the opposite direction, I secure upon the threaded portion 4 of the axle against the outer face of the wheel a nut or collar 16 which is provided in its outer end with an annular groove or recess 17 adapted to receive lubricant and from which ducts 18 extend through the nut or collar to convey the lubricant to the rollers 15 as will be readily understood on reference to Fig. 1. To avoid waste of the oil, a rather heavy lubricant may be employed or the reservoir 17 may be packed with cotton waste or similar oil-retaining material. To accommodate possible overflow of the lubricant, I provide in the wall of the central opening in the wheel annular grooves 19 which will receive and retain any excess oil which may find its way to the rollers. A lock nut 20 is fitted upon the threaded portion 4 of the axle at the outer side of the nut or collar 16 and this lock nut is turned home against the said nut or collar so as to bind the same closely upon the axle and bring it into such intimate relation to the wheel that leakage of oil between the wheel and the collar will be avoided, any possible seepage of oil which may occur being just sufficient to lubricate the contacting surfaces of the wheel and the collar and thereby minimize the frictional wear of the same. The oil or lubricant may be conveyed to the reservoir 17 through a passage 21 in the lock nut 20 from any fixed source of supply and in the drawings I have shown an oil cup 22 carried by the said lock nut 20. It will be understood, however, that the oil cup or main supply chamber may be carried upon the car body or upon some fixed part of the car truck or otherwise mounted as may be desired.

It will be readily noted from the foregoing description that by the use of my improvements the axle may be secured against rotation and the wheel rotated freely about the axle. The brasses now ordinarily required in car wheel bearings are thus rendered unnecessary and the cost of mounting the wheels is very materially reduced. In the illustrated embodiment of the invention, old brasses may be fitted around the smooth portion 5 of the axle so as to support the same in a fixed position relative to the car truck and also prevent endwise movement of the axle. It will also be understood that a shock-absorbing spring wedge may be fitted between this end portion of the axle and the top of the box in which it plays so that impact of the axle against the box will be prevented while endwise movement of the axle in rounding curves will be permitted. As the wheel revolves the lubricant will flow to the rollers 15 and overcome the frictional resistance and also serve to prevent overheating of the rollers or the car wheel and, consequently, the reduced speeds now frequently rendered necessary by overheated journals is avoided. The tread portions of my wheels may be omitted and the hub portions thereof fitted into the tread portions of wheels now in use so that the substitution of my improved car wheel for the wheels now being used will not be a source of loss to the railroad companies in the matter of equipment and will effect an actual economy in operating expenses. In the practice of my invention commercially, I will provide a bushing or ring which may be fitted about the circular portion 3 of the axle if a roller 15 should be broken, said ring having a transverse projection of a size to fill the space produced by the removal of the broken ring.

Having thus described the invention, what is claimed as new is:

1. The combination with an axle, and a car wheel mounted to rotate about the axle, of a casing fitted around the axle and secured at its end to the car wheel and provided with notches in the edge portion of its end, and a circular rib on the side of the car wheel concentric with the axle and fitting around the end of the casing and provided with inwardly projecting lugs engaging the notches in the casing.

2. The combination of an axle, a wheel fitted about the axle, rollers interposed between the axle and the wheel, a collar secured upon the axle at the outer side of the wheel and provided in its outer end with an annular lubricant receiving groove and having passages leading from said groove to the rollers, a lock nut fitted upon the axle against the outer side of said collar and covering the annular groove in the collar, said collar and nut holding the wheel and the rollers against movement toward the adjacent end of the wheel, and means for supplying lubricant through the lock nut to said groove.

In testimony whereof I affix my signature.

ANDREW L. CARROLL. [L. S.]